Jan. 31, 1967   H. D. FELSENTHAL, JR., ETAL   3,301,048
SEA STATE RECORDER
Filed April 20, 1964                              2 Sheets-Sheet 1

INVENTORS
HARRY D. FELSENTHAL JR.
WALTER W. NAKASHIMA
WILLIAM E. ZECHER
EUGENE F. ECKER
BY
C. E. Vautrain Jr. AGENT
George J. Rubens
ATTORNEY Jan. 31, 1967  H. D. FELSENTHAL, JR., ETAL  3,301,048
SEA STATE RECORDER
Filed April 20, 1964  2 Sheets-Sheet 2

INVENTORS
HARRY D. FELSENTHAL JR.
WALTER W. NAKASHIMA
WILLIAM E. ZECHER
EUGENE F. ECKER

BY C. E. Vautrain Jr. AGENT

George J. Rubens ATTORNEY

United States Patent Office 3,301,048
Patented Jan. 31, 1967

3,301,048
SEA STATE RECORDER
Harry D. Felsenthal, Jr., Camarillo, Walter W. Nakashima, Los Angeles, and William E. Zecher, Oxnard, Calif., and Eugene F. Ecker, Garland, Tex., assignors to the United States of America as represented by the Secretary of the Navy
Filed Apr. 20, 1964, Ser. No. 361,626
1 Claim. (Cl. 73—170)

The invention described herein may be manufactured and utilized by or for the Government of the United States of America for governmental purposes without the payment of any royalties thereof or therefor.

The present invention relates in general to recorders and more particularly to a method of and an apparatus for sensing and recording sea state during a selected period after which the recorder may be retrieved.

Information as to sea state is necessary in a number of applications such as launching craft, reporting weather, conducting a study of multi-path reflection problems, and other projects concerned with the study and analysis of wave motion and radar reflectivity phenomena. Wave sensing devices which have been developed are either too bulky and complex or lack the accuracy necessary in applications concerning reflectivity and its effect on wave transmission. Present wave measuring devices do not provide for recordation by a portable device nor for rapid retrieval of the recorded information.

The present invention has overcome the disadvantages of prior sensing devices and provides a sea state recorder which determines and records the height of seas in a programmed form. The device and method are relatively noncomplex and permit launching and recovery by either a boat or a helicopter with a minimum of difficulty.

Accordingly, it is an object of the present invention to provide a method of and means for accurately determining wave data through a portable device.

It is another object of the present invention to provide a system for sensing and recording wave motion information wherein the recorded information is readily available for removal and immediate analysis.

It is a further object of the present invention to provide a wave measurement device which is operable only when in the water and which provides means for direct measurement of peak to peak wave height and wave periods.

Other objects and many of the attendant advantages of this invention will be readily appreciated as the same becomes better understood by reference to the following detailed description when considered in connection with the accompanying drawings wherein.

Figure 1:
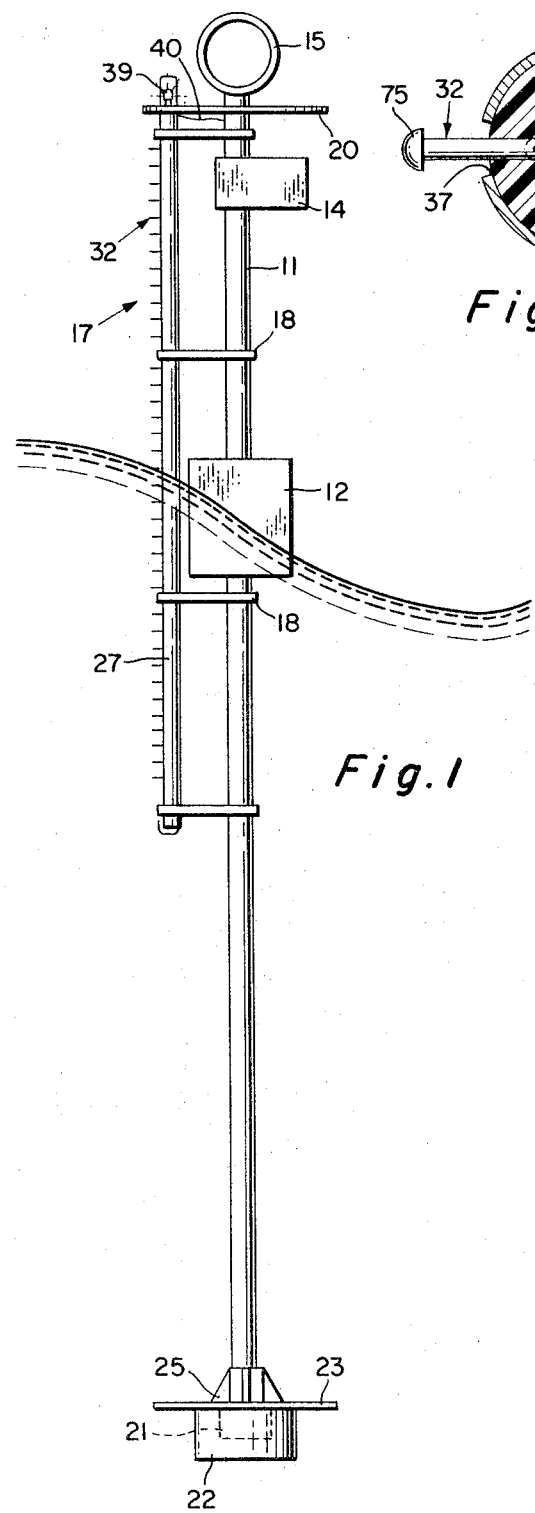
FIGURE 1 is a side elevation of the sea state recorder of the present invention in an operative environment.

Referring now to FIGURE 1 there is shown a portable sea state recording device having a mast 11 which is maintained upright by a float 12 attached thereto in the upper portion thereof. Vane 14 attached near the top of the mast 11 positions the mast selectively in the wind. Ring 15 is attached to the mast at its top end to facilitate launching and retrieval, while the sensing component 17 is positioned from the mast by brackets 18 and is directed into oncoming waves by vane 14. Ring 20 encircles the mast at the top portion thereof and provides protection against floating and other objects. The mast 11 is made more stable in the upright position by the weight of recorder assembly 21, indicated by broken lines, which is enclosed in watertight enclosure 22 positioned at the base of mast 11. Sea anchor means such as plate 23 is attached at the base of the mast to provide damping of vertical oscillatory motion. The plate means 23 may be attached to templates 25 by welding or by other suitable means such as bolting or riveting.

Float 12 must provide the required buoyancy as well as the horizontal stabilization necessary in the device. The float thus is selectively positioned to reduce to a minimum the swaying or horizontal oscillations of the entire device, and is of such a size and shape which will serve to minimize the dipping period of the entire sea state recorder. That is, the shape and size of the float and its vertical position are determined by both the dipping period of the sea environment of the operating area and the maximum height of the waves to be measured. The sea state recorder's dipping period must differ from the period of the sea state if resonant vertical motion is to be avoided.

Figure 3:
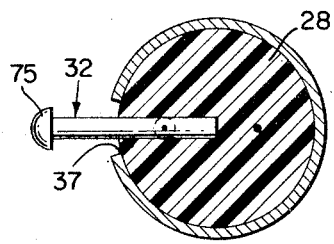
FIGURE 3 is a cross sectional view taken along line 3—3 of FIGURE 2.
Figure 2:
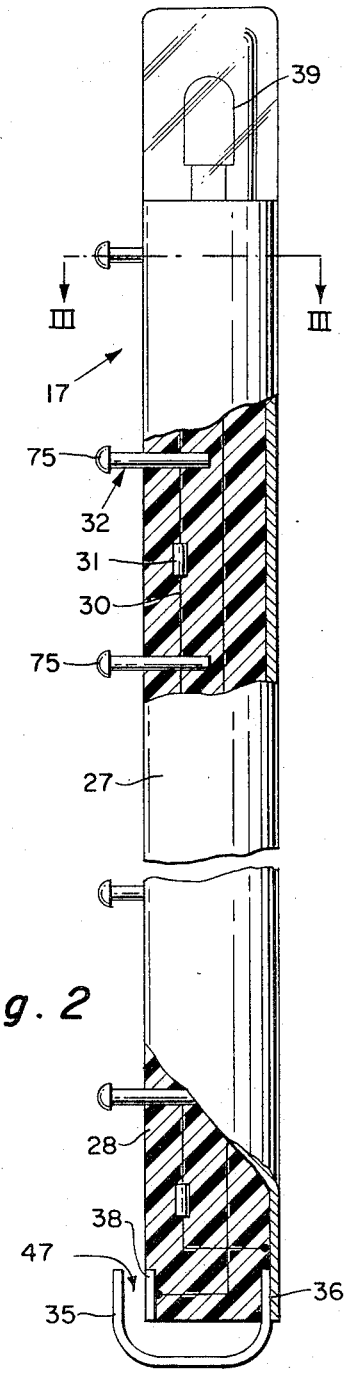
FIGURE 2 is a side elevation partly in section of the wave height sensing component of the device of FIGURE 1.

In FIGURE 2, the sensing component 17 of the device is shown in detail and includes an outer conductive support member such as brass tube 27 which is substantially filled with a non-conductive and preferably non-wettable substance such as epoxy resin or other plastic substance 28 which also is resistant to deterioration by salt water. Extending longitudinally of sensing component 17 is connector 30 which connects a plurality of resistors 31, which are interspersed one each between a plurality of terminals 32. As seen in the view of FIGURE 3, the inner portion of sensing component 17 is substantially filled with resin or other non-corrosive and non-conductive substance 28 which has sufficient rigidity when hardened to hold terminals 32 firmly in position. Resistors 31 and connector 30 are fully embedded in the plastic substance 28. At the base of sensing component 17 is connected a conductive member such as bracket 35 which is attached at one end to brass tube 27 of the sensing component 17 at 36 opposite the exposed portion 37 of non-conductive substance 28. A plate 38 is embedded in the exposed portion 37 opposite the exposed end of bracket 35, the outer surface of plate 38 being uncovered and the sides of plate 38 being spaced from tubing 27. Bracket 35 and plate 38 form a sea water switch 47 which when closed completes a circuit through power supply 43, relay 76 and timer 44. Power to lamp 39 at the top of the sensing component 17 and to the sensing component is supplied through cable 40.

Figure 4:
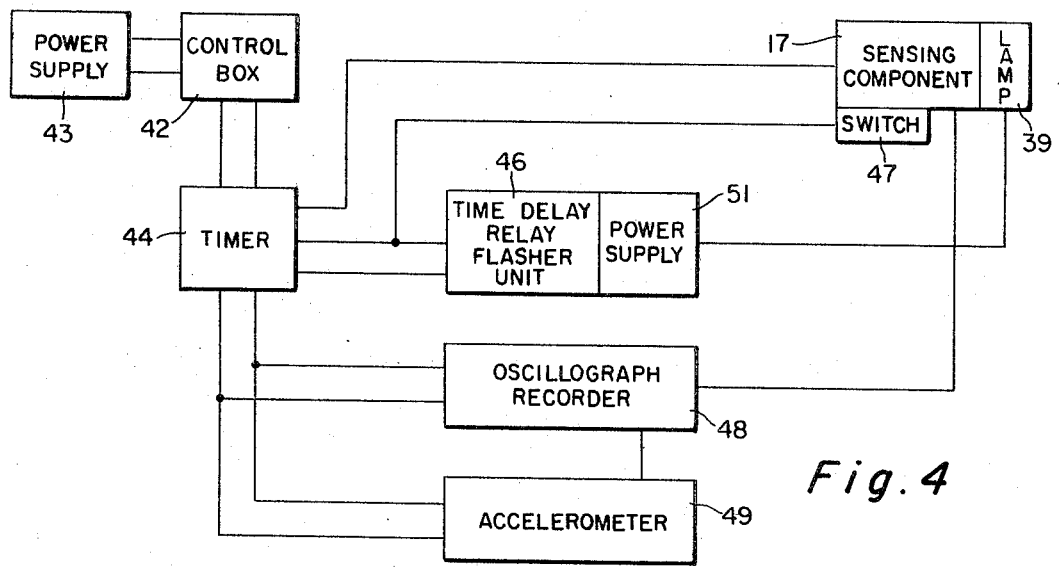
FIGURE 4 is a block diagram of the electrical components of the invention.
Figure 5:
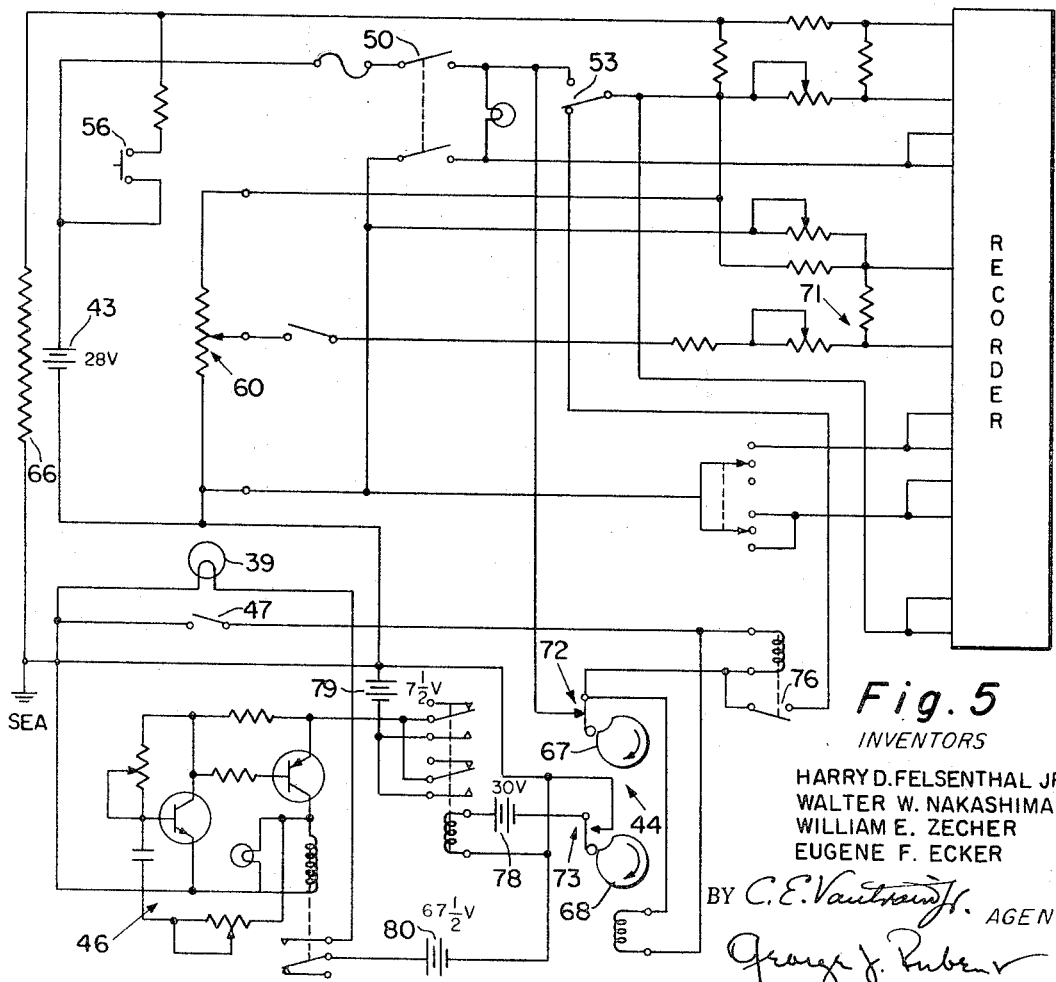
FIGURE 5 is a circuit diagram of the electrical components of the invention.

The block diagram of FIGURE 4 shows the operative components of recorder assembly 21 which include a control box 42 connected intermediate power supply 43 and timer 44 for controlling on-off power selection, with timer 44 in turn controlling power distribution to time delay relay and flasher unit 46 and the sensing component 17. Power unit 51 includes three separate power supplies of different voltage which are shown in FIGURE 5. Sea water switch 47 when immersed in a conductive medium energizes the timer 44 and relay 76. Information as to wave height and frequency is conducted to oscillograph recorder 48, while accelerometer 49 operates in conjunction with oscillograph recorder 48 to compensate for any vertical oscillatory motion of the mast and sensing component occurring during an operating period. Accelerometer 49 may be any of several available motion sensing devices of the inertia responsive type. One such type is the Bourn Model 602 accelerometer of ±2.5 g. output. The responsive element of this accelerometer is mounted in an upright position at the base of mast 11 and produces a positive output on upward acceleration and a negative output on downward accelerating of the mast. The accelerometer has an airdamped voltage pickoff type potentiometer 60, shown in FIGURE 5, the output of which is fed to bridge circuit 71 as shown. In the normal rest position of the recorder, the accelerometer output is +1 g. Oscillograph recorder 48 may be any of several recorders adapted electrically and physically to the invention, that used being a Century Model 409D remotely operated recorder having twelve galvanometer trace channels. The recorder also has two timing channels and selectable internal timing frequencies of 10 cycles per second or 100 cycles per second. Its photo magazine will hold 100-ft. rolls of film 3½ inches in width, In the circuit diagram of recorder assembly 21 shown in FIGURE 5, power supply 43 is shown as providing a source of 28 volts D.-C. through the control elements of on-off switch 50, and salt water switch 47 to timer 44 and relay 76. When the device is immersed in a conductive medium such as salt water, switch 47 completes the circuit through timer 44 and relay 76 to energize the system and start the recording of data. The stepped resistance, represented in the instant embodiment by resistance element 66, comprises forty resistors having terminals 32 spaced 3 inches apart and connected intermediate successive resistors. That is, each resistor may be considered as connected to a terminal, each terminal when immersed in the sea providing a shunted resistance to ground which in this case is tubing 27. Timer 44 operates to provide power through resistance element 66 during a measuring period determined by the rate of rotation of roller detents 67 and 68 the circuits associated with which are energized upon "closing" of the salt water switch 47. It may be seen that upon rotation of roller detent 67 one full revolution microswitch 72 cuts off power to resistance element 66 and recorder 48, while at the same instant roller detent 68 connects time delay unit 46 to power supply 43 through microswitch 73. Time delay unit 46 is representative of conventional multivibrator devices for providing pulses of energy, in this case to lamp 39 which is situated atop the sensing component 17. When the resistance element 66 is energized, the level of sea water sweeping across the terminals 32 provides a decreasing resistance which increases the current flow in galvanometer deflection coils, not shown, of recorder 21, causing trace movements in the oscillograph. The current increase is occasioned by adding shunt resistance in parallel to resistors 31 as wave height increases, a decreasing total resistance resulting. The ensuing recorded data comprises a series of steps which follow wave height. To obtain wave height in inches it is necessary only to multiply the number of steps by 3 since the terminals, in the present embodiment, are spaced 3 inches apart. Compensation is provided for vertical oscillatory movement of the mast and sensing component 17 through accelerometer 49 which serves to introduce a change in resistance through potentiometer 60 in a direction opposite to the motion of the sensing component. That is, if the sensing component is rising and thereby giving a reading which is less than the true wave height, then the accelerometer output can be doubly integrated to derive vertical diplacement of the sensing unit, which is then added to the recorded wave height. The output of bridge circuit 71 is representative of mast movement and is fed to one of the recorder galvanometers, not shown, for insertion of a correction in the height indicating galvanometer, not shown. Manual-automatic selector switch 53 and event marker switch 56 also are included.

The operation of the device has been covered in part, however, the prior explanation is supplemented in the following paragraphs. The sea state recorder of the present invention is adapted to be placed in the sea from a helicopter or surface vessel with a minimum of difficulty. Upon becoming immersed, the sea water switch 47 is closed thereby closing relay 76 and activating timer 44, providing 28 volts D.-C. to the oscillograph recorder motor, not shown. Terminals 32, when immersed in sea water, are shunted by the resistance of the sea water between the terminals and the tubing 27 of sensing component 17. Immersion of the terminals 32 shunts those resistors 31 below the uppermost immersed terminal and, since resistors 31 are in series with galvanometer shunt resistors, not shown, in control box 42, varies current flow causing a corresponding galvanometer trace deflection, not shown, in oscillograph recorder 48. The recorder thus records wave progress past sensing component 17 in staircase-like trace movements.

The accelerometer 49, which senses the vertical motions of mast 11 caused by larger swells and waves, introduces a correcting signal to the oscillograph recorder through the accelerometer galvanometer trace deflection which occurs with the unbalancing of bridge circuit 71.

At the end of a recording period, which is 12 minutes for the present embodiment, timer 44 roller detent 67 releases microswitch 72 thereby removing power supply 43 from the recording circuit. Simultaneously, the circuit containing transistorized time delay unit 46, flasher lamp 39 and D.-C. power sources 78, 79 and 80 is closed enabling the time delay relay contacts to intermittently deliver 67½ volts D.-C. to the flasher lamp. Lamp 39 indicates the completion of the recording period and also provides means for locating the sea state recorder in extremely high wave areas.

Referring again to FIGURE 2, it may be seen that terminals 32 have exposed head portions 75 in the circuit through the conductive medium to the conductive tubing 27 of the sensing component. The depth readings indicated on the oscillograph form a series of steps with each step indicating a separate immersed terminal 75. Since the oscillograph provides a chronological rate of recordation, wave height as well as the wave period or frequency is determined. Wave phase is, of course, represented by the speed at which two successive wave peaks pass the sensing component. Wave direction is obtained by observing the position assumed by wave 14 after immersion of the device. Wave height and phase information are recorded for a period of time which is determined by timer 44, and, upon completion of this period of time, the recorder is de-energized. It will be appreciated that various elements in the circuit of FIGURE 5 may be replaced by other elements similar in function within the concept of the invention. That is, the delay unit or multivibrator may be eliminated and a steady light shown at the top of the pole, or the oscillograph may be replaced by a telemetry system for transmitting data directly to a receiving station. Also, data may be recorded by a tape recorder and mast 11 and sensing component 17 may be combined in a single structural element in lieu of the two elements shown.

The readings received by the present device are rendered exceedingly accurate through both the damping of vertical motion provided by plate 23 to which recorder 22 is attached, and the accelerometer within the recording circuit which provides compensation for the vertical oscillatory motion not damped by plate 23. The device provides a positive, direct reading of wave height by actual physical contact between the conductive medium and the exposed terminals along sensing component 17. The device is light in weight so that it may be easily handled and conveyed by helicopter to an area where sea state is desired to be determined, and may be retrieved at will. Vane 14 insures that the sensing element will be positioned wtih the heads of terminals 32 directed into the wind and therefore into the seas thereby providing readings of wave front information as each wave approaches and passes across the terminals. In this manner, errors which may be introduced by spray being blown or by side swells which may be encountered where the device is not headed into the wind are avoided. The number of terminals 32 and resistors 31 may be increased or decreased depending upon whether finer or less fine increments of measurement are desired, and upon the maximum trough-to-peak wave height to be measured.

It will be recognized that many modifications and variations of the present invention are possible in the light of the above teachings, for example, mast 11 and sensing component 17 could be incorporated in a single upright member within the concept of the invention. It is therefore to be understood that within the scope of the appended claims the invention may be practiced otherwise than as specifically described.

What is claimed is:

A self-contained sea state recorder comprising: a mast and a float mounted upon the mast in the upper portion thereof for disposing the mast in an upright position in water; sea anchor means attached to the base of said mast for damping vertical mast motion; electrically conductive support means fixedly attached to said mast in the upper portion thereof; said support means disposed substantially parallel to said mast; wind vane means secured to said mast near the top thereof and extending outwardly therefrom in a direction different from the direction in which said support means extends so as to position said support means to windward of said mast; a plurality of electrical terminals spaced longitudinally along and attached to said support means and extending in a direction therefrom remote from said mast; a plurality of electrical resistance means connected one each intermediate adjacent pairs of said terminals; said resistance means being insulated from the water and said terminals being exposed to the water at least in portions remote from the support means; and electrical recorder means connected in series with said plurality of resistance means; said recorder means including an electrical power supply and a timer whereby wave height is determined by the number of terminals shunted by water contacting the terminals and the support means, and wave phase is determined by the span between successive waves; said sea anchor means including a flange attached to the mast at the base thereof; said recorder means includes accelerometer means to compensate for vertical oscillatory motion of said mast in response to wave motion; and a lamp positioned atop said support means and connected to said power supply and said timer whereby said lamp may be energized at the termination of a selected period of of sea state recording.

References Cited by the Examiner

UNITED STATES PATENTS

| | | | |
|---|---|---|---|
| 2,447,069 | 8/1948 | Holcomb | 177—386 |
| 2,768,368 | 10/1956 | Crane et al. | 340—207 |
| 2,839,920 | 6/1958 | MacAnespie | 73—170 |
| 2,845,796 | 8/1958 | Morison | 73—170 |
| 2,869,108 | 1/1959 | Smith | 340—2 |
| 3,110,178 | 11/1963 | Marks et al. | 73—170 |

OTHER REFERENCES

Upham, S. H.: Electric Wave Staff. (Hydrographic Office Model MKL) U.S. Hydrographic Office Technical Report #9. Washington, D.C., 15 pp., March 1955. FIGS. 1 and 2, and pages 1, 4, 8 and 9 relied on.

Pochapsky, T. E.: "Exploring Subsurface Waves with Neutrally Buoyant Floats," I. S. A. Journal, October 1961, pages 34–37 relied on.

RICHARD C. QUEISSER, *Primary Examiner.*

J. J. SMITH, *Assistant Examiner.*